US010973253B2

(12) United States Patent
Sandhu et al.

(10) Patent No.: US 10,973,253 B2
(45) Date of Patent: Apr. 13, 2021

(54) ROASTING SYSTEM HAVING SELF-ALIGNING AGITATOR AND DOOR BEARING ASSEMBLY

(71) Applicant: Bellwether Coffee Co., Berkeley, CA (US)

(72) Inventors: John Sandhu, Boulder, CO (US); Arno Holschuh, Berkeley, CA (US); Ricardo Lopez, Bolinas, CA (US); Jeremiah Peevyhouse, Berkeley, CA (US); Peter Schmehl, Berkeley, CA (US); Neil Sandhu, Boulder, CO (US); Jeff Wyatt, Bozeman, MT (US); Mose O'Griffin, San Francisco, CA (US); Andrew Damele, San Francisco, CA (US); Michael Shawver, Baltimore, MD (US)

(73) Assignee: Bellwether Coffee Co., Berkeley, CA (US)

( * ) Notice: Subject to any disclaimer, the term of this patent is extended or adjusted under 35 U.S.C. 154(b) by 13 days.

(21) Appl. No.: 16/386,727

(22) Filed: Apr. 17, 2019

(65) Prior Publication Data

US 2019/0320703 A1 Oct. 24, 2019

Related U.S. Application Data

(60) Provisional application No. 62/660,588, filed on Apr. 20, 2018.

(51) Int. Cl.
*A23N 12/10* (2006.01)
*A23F 5/04* (2006.01)
(Continued)

(52) U.S. Cl.
CPC .............. *A23N 12/10* (2013.01); *A23F 5/04* (2013.01); *A23N 12/083* (2013.01); *A23N 12/12* (2013.01); *A23V 2002/00* (2013.01)

(58) Field of Classification Search
CPC ...... A23N 12/10; A23N 12/083; A23N 12/12; A23F 5/04; A23V 2002/00
(Continued)

(56) References Cited

U.S. PATENT DOCUMENTS

| 2,632,706 A | * | 3/1953 | Montgomery, Jr. | ...... A23F 5/04 426/233 |
| 4,094,633 A | * | 6/1978 | Peterson | ................. A23F 5/043 426/469 |

(Continued)

FOREIGN PATENT DOCUMENTS

| WO | WO 1997/016985 | 5/1997 |
| WO | WO 2005/082177 | 9/2005 |
| WO | WO-2019204444 A1 * | 10/2019 ............. A23N 12/10 |

OTHER PUBLICATIONS

International Search Report and Written Opinion for International Application No. PCT/US2019/027878, dated Jul. 1, 2019, 8 pages.

*Primary Examiner* — Stephen M Gravini
(74) *Attorney, Agent, or Firm* — Cooley LLP

(57) ABSTRACT

A bean roasting system includes a roasting drum, an agitator, and a door. The roasting drum has an inside surface extending from a back end to a front end. The agitator has blades mounted to an axial shaft. The axial shaft has an anterior end portion. The door is mounted rotationally relative to the roasting drum and includes a glass plate and a bearing assembly. The glass plate provides visual access to contents inside the roasting drum when the door is closed. The bearing assembly includes an outer housing and an inner bearing. The outer housing is mounted to the glass plate. The inner bearing defines a receiving hole that receives and supports the anterior end portion of the axial shaft when the door closed.

18 Claims, 18 Drawing Sheets

(51) Int. Cl.
*A23N 12/12* (2006.01)
*A23N 12/08* (2006.01)

(58) Field of Classification Search
USPC .......................................................... 34/499
See application file for complete search history.

(56) References Cited

U.S. PATENT DOCUMENTS

| | | | | |
|---|---|---|---|---|
| 4,614,439 | A * | 9/1986 | Brunt | ........................ B28C 5/40 |
| | | | | 366/154.2 |
| 5,016,362 | A * | 5/1991 | Nakamura | .............. A23N 12/10 |
| | | | | 34/129 |
| 5,638,607 | A | 6/1997 | Lemme et al. | |
| 6,036,988 | A | 3/2000 | Lemme et al. | |
| 7,168,846 | B1 | 1/2007 | Maupin | |
| 7,524,386 | B2 * | 4/2009 | George | ................. B01F 3/1221 |
| | | | | 156/39 |
| 7,838,799 | B2 * | 11/2010 | Freedman | ................... A23F 5/04 |
| | | | | 219/385 |
| 9,505,510 | B2 * | 11/2016 | Hatherell | .................. B65D 1/06 |
| 10,299,505 | B2 * | 5/2019 | Montoya | ................... A23P 20/12 |
| 10,412,988 | B2 * | 9/2019 | Jacobsen | .................... A23F 5/04 |
| 2004/0074400 | A1 | 4/2004 | Song | |
| 2013/0059073 | A1 * | 3/2013 | Jiang | ................. C23C 16/45561 |
| | | | | 427/212 |
| 2016/0183586 | A1 | 6/2016 | Min et al. | |
| 2018/0049587 | A1 | 2/2018 | Liao | |
| 2018/0295870 | A1 | 10/2018 | Lopez et al. | |
| 2019/0133377 | A1 * | 5/2019 | McCullough | ........ A23N 12/125 |
| 2019/0320703 | A1 * | 10/2019 | Sandhu | ................... A23N 12/12 |
| 2019/0328026 | A1 * | 10/2019 | Westra | .................... A23N 12/10 |

* cited by examiner

ROASTING SYSTEM HAVING SELF-ALIGNING AGITATOR AND DOOR BEARING ASSEMBLY

CROSS-REFERENCE TO RELATED APPLICATIONS

This non-provisional patent application claims priority to U.S. Provisional Application Ser. No. 62/660,588, entitled "ROASTING SYSTEM HAVING SELF-ALIGNING AGITATOR AND DOOR BEARING ASSEMBLY," filed on Apr. 20, 2018, under the benefit of 35 U.S.C. § 119(e), which is incorporated herein by reference.

FIELD OF THE DISCLOSURE

The present disclosure pertains to the roasting of food products, particularly to beans, and more particularly to coffee beans. Yet more particularly the present disclosure describes a roasting system that has an improved roasting drum that allows contents to be visually observed during a roasting process while providing a self-aligning mechanical mount for an internal bean agitator.

BACKGROUND

Food roasting machines are in wide use. One particularly common roasting machine is utilized to prepare coffee beans to be either packaged or ground and brewed. A typical roasting machine includes a roasting chamber for supporting, agitating, and roasting beans. It is desirable to be able to visually observe beans as they are roasting. It is desirable to provide this function while also providing a stable mechanical system for automated agitation of the beans.

SUMMARY

In an aspect of the disclosure, a bean roasting system includes a roasting drum, an agitator, and a door. The roasting drum has an inside surface extending from a back end to a front end. The agitator has blades mounted to an axial shaft. The axial shaft has an anterior end. The door is mounted rotationally relative to the roasting drum and includes a glass plate and a bearing assembly. The glass plate provides visual access to contents inside the drum when the door is closed. The bearing assembly includes an outer housing and an inner bearing. The outer housing is mounted to the glass plate. The inner bearing defines a receiving hole that receives and supports the anterior end of the axial shaft when the door closed.

In one implementation the axial shaft has a posterior end. The bean roasting system includes an agitator motor coupled to the posterior end of the axial shaft.

In another implementation the agitator blades rest against a lower inside surface of the roasting drum when the door is rotated away from the roasting drum and in an open position. Moving the door to the closed position causes the receiving hole of the bearing assembly to engage the anterior end portion and lift to the blade assembly off of the lower inside surface of the drum.

In yet another implementation the receiving hole in the bearing assembly is tapered to provide an alignment between the receiving hole and the anterior end portion of the axial shaft. The axial shaft tapers toward the anterior end portion. The axial shaft anterior end portion has a taper angle that substantially matches a taper angle of the receiving hole.

In a further implementation the bearing assembly includes a circular ball bearing race between the outer housing and the inner bearing of the bearing assembly.

In a yet further implementation the glass plate has a central opening. The bearing assembly seals to the glass plate to seal the central opening in the glass plate.

In another implementation the inside surface of the drum defines a central axis of the drum. The axial shaft of the agitator defines a central axis of the agitator. The central axis of the drum is aligned to the central axis of the agitator when the anterior end portion of the axial shaft engages the receiving hole as the door is moved to a closed position.

DETAILED DESCRIPTION

The following description incorporates content from patent application U.S. patent application Ser. No. 15/949,903, filed on Apr. 10, 2018 which is a non-provisional counterpart of U.S. Provisional Application Ser. No. 62/485,206, Entitled "ROASTING SYSTEM WITH CLEAN EMIS- SIONS AND HIGH THERMAL EFFICIENCY" by Ricardo Lopez et al., filed on Apr. 13, 2017 which is hereby incorporated by reference.

Figure 1:
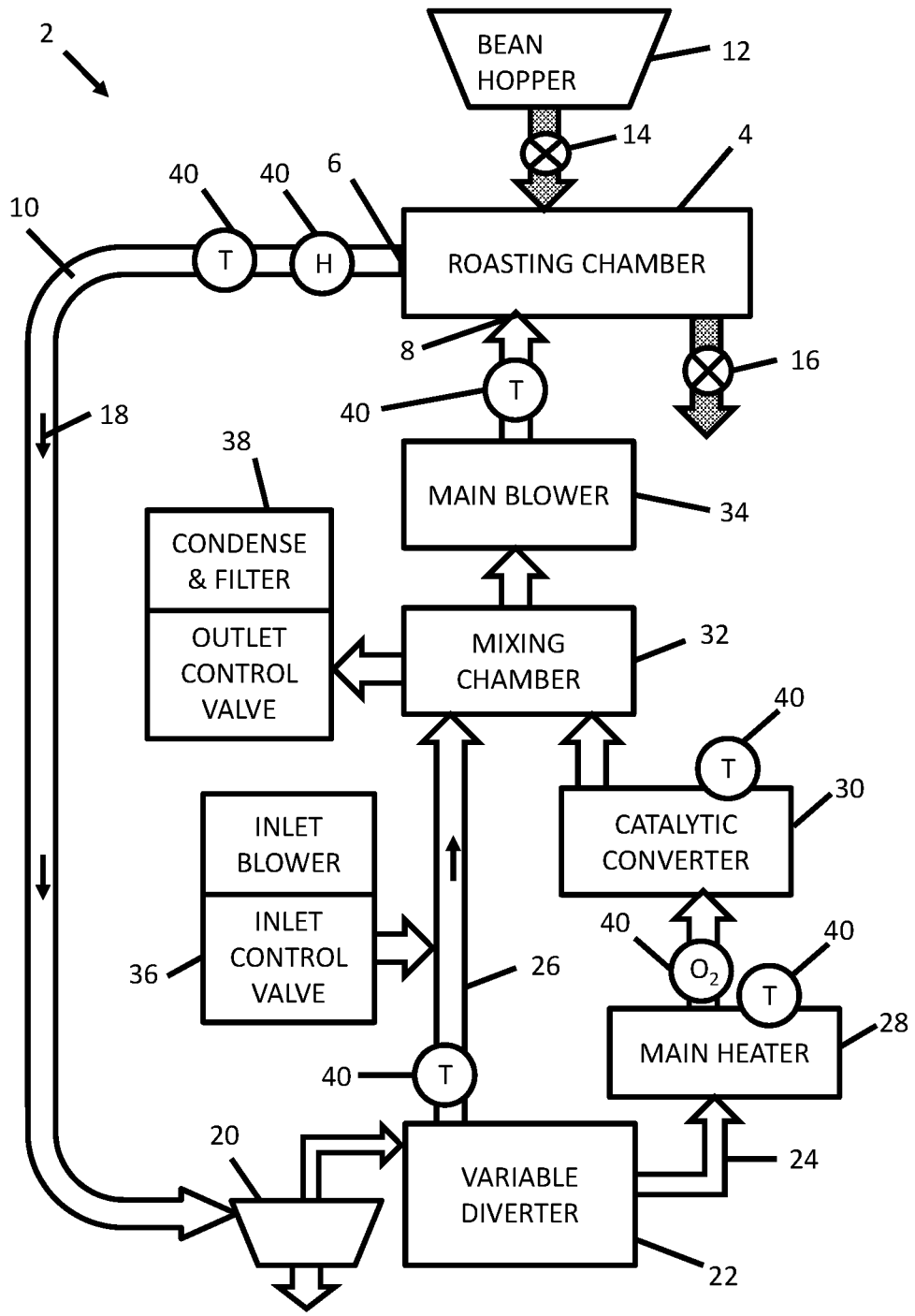
FIG. 1 is a block diagram schematic of an example roasting system.

FIG. 1 is a block diagram schematic of roasting system 2, according to an embodiment. Roasting system 2 includes a roasting chamber 4 having a gas outlet 6 and a gas inlet 8. A gas conduit 10, in combination with other relevant components discussed below, defines a recirculating gas flow path (referenced herein interchangeably as gas conduit 10 or recirculating gas flow path 10) and is coupled to and includes the roasting chamber 4. The recirculating gas flow path 10 performs a number of functions including removing debris and noxious gases from the roasting process and regulating a temperature of the roasting chamber 4. The roasting system 2 also includes a bean hopper 12 for a loading unroasted beans before they are inputted to the roasting chamber 4. Between the bean hopper 12 and the roasting chamber 4 is a load valve 14 for releasing the beans from the hopper 12 into the roasting chamber 4. An unload valve 16 is for releasing the beans to a bean cooling system (not shown).

During operation of the roasting system 2 a flow stream 18 of gas is established in the recirculating gas flow path 10 from the gas outlet 6 to the gas inlet 8 of the roasting chamber 4. After leaving the gas outlet 6 the flow stream 18 passes to a cyclonic separator 20, which removes debris from the gas flow stream 18 that is collected below the cyclonic separator 20.

The flow stream 18 then passes to a variable diverter 22. Variable diverter 22 splits the gas flow path 10 into at least two flow path segments including a treated flow path segment 24 and a bypass flow segment 26. The variable diverter 22 controls a "bypass percentage," which is a percentage of the flow stream 18 that is diverted into the bypass flow segment 26. The bypass percentage can be varied between zero percent to 100 percent of the mass flow of the flow stream 18. When the bypass percentage is zero then all of the mass flow of the flow stream 18 is flowing through the treated flow path segment 24. When the bypass percentage is X, then 100–X percent of the mass flow of the flow stream is passing through the treated flow segment 24 and X percent of the mass flow of the flow stream 18 is passing through the bypass flow segment 26. When the bypass percentage is 100, then all of the mass flow of the flow stream 18 is passing through the bypass flow segment 26.

The treated flow segment 24 includes a heater 28 and a catalytic converter 30 in a fluidic series. In the embodiment shown in FIG. 1, the heater 28 is the main heater 28 for the catalytic converter 30 and the roasting chamber 4. The catalytic converter 30 has an operating temperature (referred to as a catalyst temperature $T_{CT}$) that is used for catalysis. A catalyst temperature $T_{CT}$ is typically in a range of 500 to 1000 degrees Fahrenheit. On the other hand, the roasting chamber 4 has a roasting chamber temperature $T_{RC}$ that can vary between 150 and 500 degrees Fahrenheit depending upon a desired roasting process and a step within the process.

The bypass flow segment 26 is coupled to a mixing chamber 32 (also referred to herein as a junction 32). The mixing chamber 32 (junction 32) defines the point at which the separated or split flow paths recombine into one flow path. Between the junction 32 and the gas inlet 8 of the roasting chamber 4 is a main blower 34.

Coupled to the bypass flow segment 26 is an inlet component 36 to allow ambient air to enter the recirculating gas flow path 10. The inlet component 36 includes an inlet control valve and inlet blower coupled in series to allow and force ambient air into the recirculating gas flow path 10. Coupled to the mixing chamber 32 is an outlet component 38 to release gas from the recirculating gas flow path 10 to the ambient environment. The outlet component 38 includes an outlet control valve, a condenser, and a filter in series.

The roasting system 2 employs various sensors 40 including temperature sensors T. These sensors 40 are utilized to enable a closed loop control of various processes within the roasting system 2.

In alternative embodiments the bypass flow segment can include an auxiliary heating and/or cooling temperature modulator 44. In another alternative embodiment the main blower 34 can be located at other locations in the recirculating gas flow path 10 or multiple blowers can be employed. In yet another alternative embodiment, the inlet component 36 may be integrated into the mixing chamber, and the outlet component 38 may be moved to a point in the fluid flow path that is immediately after the catalytic converter.

Figure 2:
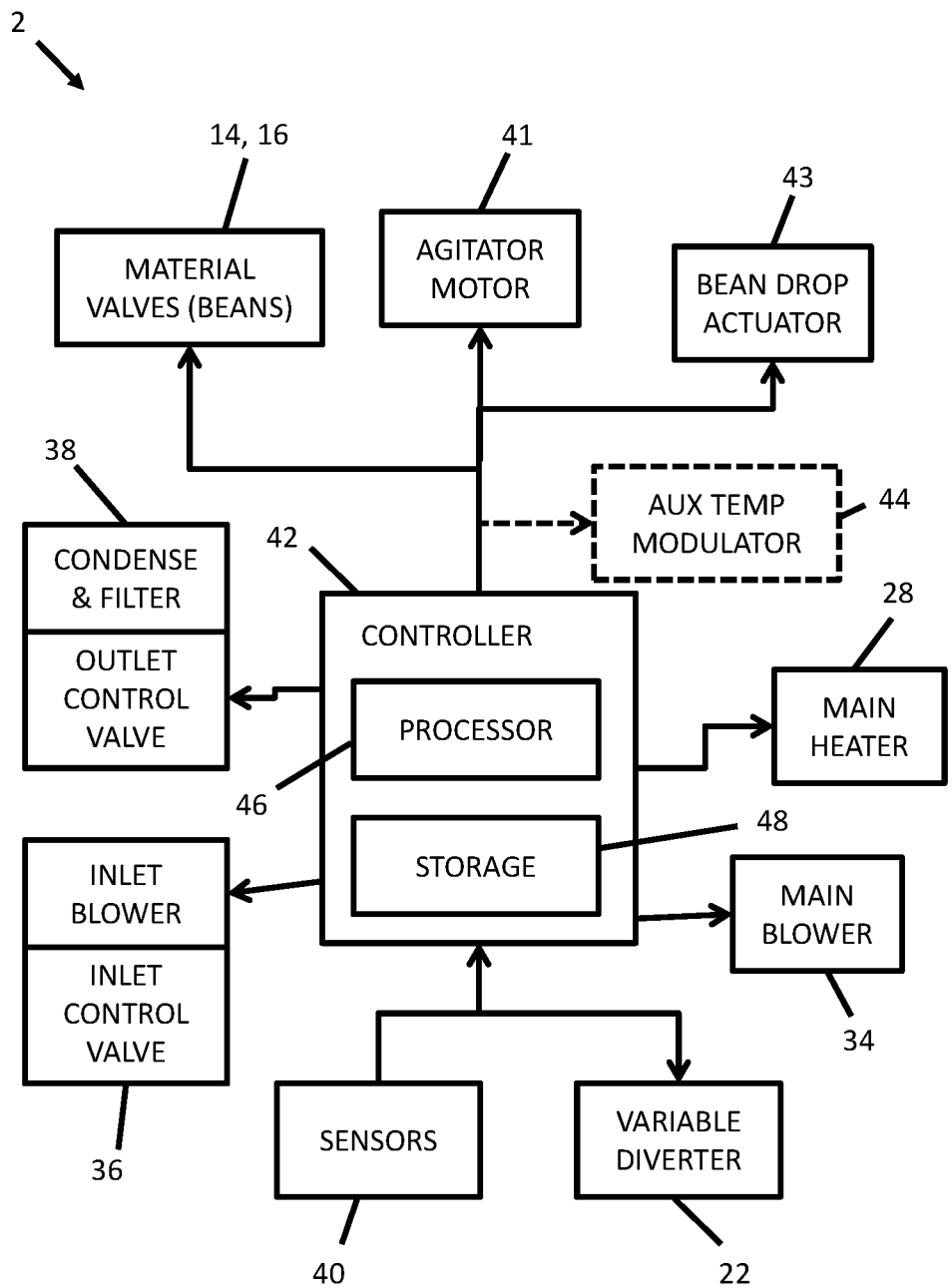
FIG. 2 is an electrical block diagram of an example roasting system.

FIG. 2 is an electrical block diagram of the roasting system 2 of FIG. 1. Some reference numbers in FIG. 2 correspond to reference numbers in FIG. 1. Roasting system 2 includes a controller 42 that receives signals from sensors 40 and provides control signals to various components including valves 14 and 16, variable diverter 22, main heater 28, main blower 34, inlet component 36, outlet component 38, and optionally an auxiliary temperature modulator 44 (providing heating and/or cooling). The controller is also controllably coupled to an agitator motor 41 and a bean drop actuator 43.

Controller 40 includes a processor 46 coupled to an information storage device 48. The information storage device 48 includes a non-transient or non-volatile storage device storing software that, when executed by processor 46, controls the various components of roasting system 2 and provides functions for which the controller 42 is configured. The controller 42 can be a located at one location or distributed among multiple locations in roasting system 2. For example, controller 42 can be disposed within a housing (not shown) of roasting system 2 and/or a housing of an appropriate component of roasting system 22 such as a housing of the variable diverter 22. The controller can be electrically and/or wirelessly linked to the various components of roasting system 2.

The controller 42 is configured to define and activate a plurality of different predetermined or predefined operating modes. Each operating mode can define a step or process in a sequence of steps and processes that are executed during the operation of the roasting system 2. An example sequence will be described with respect to FIG. 3.

A particular operating mode can be defined, for example, in part by a time duration and a state of various components of the roasting system 2. States that are directly controlled are those of components that receive direct control signals from the controller 42. Examples of directly controlled states include the bypass percentage of the variable diverter 22, an output power of the main heater 28, an airflow rate of the main blower 34, and a control of the inlet and outlet components 36 and 38 respectively. An optional example would be control of auxiliary temperature modulator 44.

States that are indirectly determined are those states that are a consequence of those states that are directly determined. These include a temperature of the roasting chamber 4 and an internal temperature of the catalytic converter 30. These temperatures are determined (and thereby indirectly controlled) through the control of the main heater 28, the main blower 34, and the variable diverter 22.

Controller 42 reads signals or data from sensors 40 indicative of various temperatures within the roasting system 2. These signals or data may be indicative of a temperature of the roasting chamber 4, the catalytic converter 30, or various portions of the recirculating flow path 10. The controller 42 then modulates the directly controlled states to maintain desired temperature set points.

The controller also configured to operate the agitator motor 41 and the bean drop actuator 43 when beans are dropped from the roasting chamber 4 to a cooling chamber. This will be described in detail infra.

Figure 3:
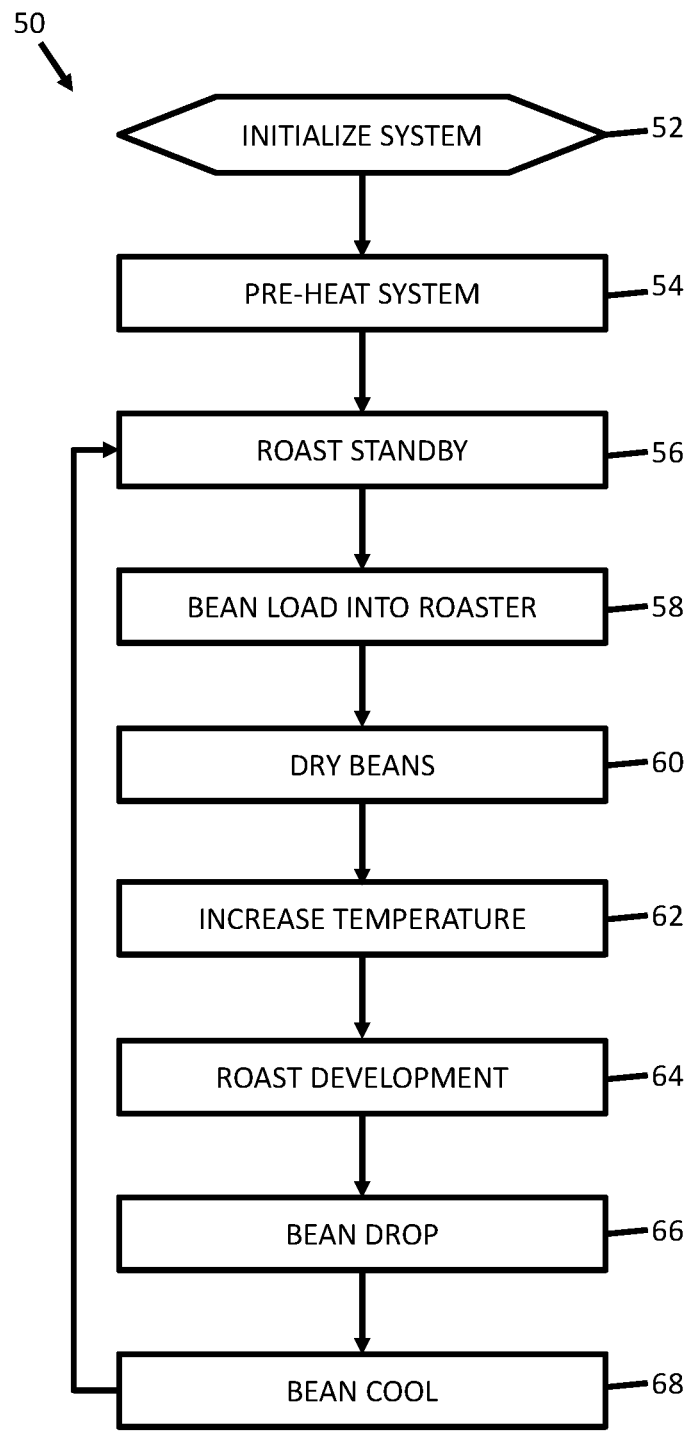
FIG. 3 is a flowchart representing an example sequence of operation for a roasting system.

FIG. 3 is a flowchart representing an example sequence of operation 50 for the roasting system 2. Each step of the operational sequence is based upon a predetermined operating mode an indicator for which is stored in controller 42. For each of these steps the controller 42 controls various components as discussed with respect to FIG. 2.

Step 52 represents an initial state of the roasting system 2 after it has been off long enough to equilibrate with an ambient environment. The heater power is zero, meaning that no power is being sent to main heater 28. The main blower 34 is off. As a result the catalytic converter 30 temperature and the roasting chamber 4 temperatures are both at ambient temperature which can be about 70 degrees Fahrenheit.

Step 54 represents a pre-heat mode for the roasting system 2. This operational mode can have a time duration of about 30 minutes. During this mode the power delivered to the main heater 28 is in a "high" state. In one implementation the power delivered to main heater 28 is more than 75 percent or even 100 percent of the maximum power level that is used for the main heater 28. The main blower 34 is operated in a "high" state. In one particular implementation the main blower 34 is operated with a flow rate of 200 cubic feet per minute, and the bypass percentage starts out at a low value or less than 10 percent or even zero and then ramps up to bypass percentage of more than 50 percent, more than 75 percent or about 85 to 90 percent. In another implementation, the bypass percentage is kept at a low value throughout preheat, and the blower speed is decreased as the system heats up in order to reduce the delivery energy to various parts of the system. In this case, the heater temperature remains high, but the energy drawn and outputted by the heater is lower due to the decrease in energy transport. During the pre-heat mode the temperature of the catalytic converter 30 ramps up from ambient temperature to an effective catalytic temperature in a range of 500 to 1000 degrees Fahrenheit. In one implementation the catalytic temperature is about 800 degrees Fahrenheit. The roast chamber 4 temperature also ramps up to a temperature range to begin the roasting process. In one embodiment this temperature is in a range of 300 to 400 degrees Fahrenheit or about 350 degrees Fahrenheit.

Step 56 represents a standby mode that has an indeterminate duration. During this operational mode the power delivered to the main heater 28 is in a "low" state. In one implementation the power delivered to heater 28 is less than 50 percent in a range of about 5 to 15 percent of the maximum power level that is used for the main heater. This low main heater 28 power is all that is used to maintain the catalytic converter 30 temperature and the roasting chamber 4 temperature. In one implementation, the main blower is operated in a "low" state. In one implementation the main blower is operated with a flow rate of 100 cubic feet per minute (CFM). In this case, the bypass percentage is more than 50 percent, more than 75 percent, or in a range of about 85 to 90 percent. In another implementation, the main blower operates at an output less than 100 cubic feet per minute (CFM), and the speed is modulated to control the energy distribution throughout the system. In this case, the bypass percentage is kept low, around 0-10 percent. In all cases, catalytic converter 30 temperature is in a range of 500 to 1000 degrees Fahrenheit or about 800 degrees Fahrenheit. The roasting chamber 4 temperature is in a range of 300 to 400 degrees Fahrenheit or about 350 degrees Fahrenheit.

Step 58 represents an operational mode in which the valve 14 is opened to load beans from the hopper 12 to the roasting chamber 4. The component states for step 58 are the same as those of step 57 except that the main blower is operated in a "high" state. In one implementation the main blower 34 is operated with a flow rate of 200 cubic feet per minute.

Steps 60, 62, and 64 represent a complete cycle for bean roasting. During these steps the main blower 34 is operated in a "high" state which can be 200 cubic feet per minute. The combined time duration for steps 60, 62, and 64 is about 10-15 minutes.

Step 60 is an operational mode for drying the beans, which can last about 1-3 minutes. The main heater 28 is operated with a "low" power level, which can be in a range of 10 to 20 percent of maximum power. The bypass percentage is in a range of 50 to 90 percent or about 71 percent. The catalyst temperature in a range of 500 to 1000 degrees Fahrenheit or about 800 degrees Fahrenheit. The roast chamber 4 temperature is in a range of about 170 to 180 degrees Fahrenheit or about 175 degrees Fahrenheit.

Step 62 is a "recovery ramp" mode during which the roasting chamber temperature is increased to a roasting development temperature. The "recovery ramp" mode can have a duration of about 3-6 minutes. The main heater 28 is operated with a "high" power level which can be in a range of 75 to 100 percent of maximum power. The bypass percentage is in a range of zero to 10 percent so that some gas having a higher temperature from the main heater 28 is directed to the roasting chamber 4. As a result, the roasting chamber temperature increases to a roasting development temperature, which can be about 390 degrees Fahrenheit. During step 62 the catalyst temperature may fall to about 650 degrees Fahrenheit.

Step 64 is a roasting development mode during which the temperature of the roasting chamber 4 is increased. The roasting development mode has a duration of about 3 minutes. The main heater 28 is operated with a "low" power that can be 20 to 30 percent of maximum power. The bypass percentage is in a range of 50 to 100 percent or about 76 percent. The bypass percentage can be increased while the heater input is decreased during this mode. The roasting chamber 4 temperature increases from about 390 degrees Fahrenheit to about 460 degrees Fahrenheit. The catalyst temperature increases from about 650 degrees Fahrenheit to about 750 degrees Fahrenheit. Also as part of this mode, the inlet 36 and outlet 38 components are operated to allow a one to five percent gas exchange with the ambient air environment.

During step 66 the valve 16 is opened to drop the roasted beans into a cooling chamber. During step 68 the beans are cooled and the system states are returned to those of the standby mode of step 56 after a preheating operation.

As a note, the specific states described above with respect to FIG. 3 can vary depending on a desired "roasting profile." In particular, the roasting chamber 4 temperature states are a function of such a roasting profile. Thus, the described sequence 50 can have variations in terms of component states and the temperatures indicated with respect to FIG. 3 are examples for a particular roasting profile or set of roasting profiles.

Referring to FIG. 1, the sensors 40 can include humidity (designated H) and oxygen (designated $O_2$) sensors. The controller 42 can use information from these sensors to track progress of the roasting steps 60-64 (of FIG. 3). As a unique example, the controller 42 can infer information about the roast process by analyzing the humidity versus time of gas that is exiting the outlet 6 of the roasting chamber 4.

A milestone event during roasting steps 60-64 is a "first crack" of the beans. Once this begins, the remaining time and temperature of the roasting profile can be more accurately determined. The added time and temperature is dependent on the type of roast (e.g., light roast versus full French roast).

Figure 4:
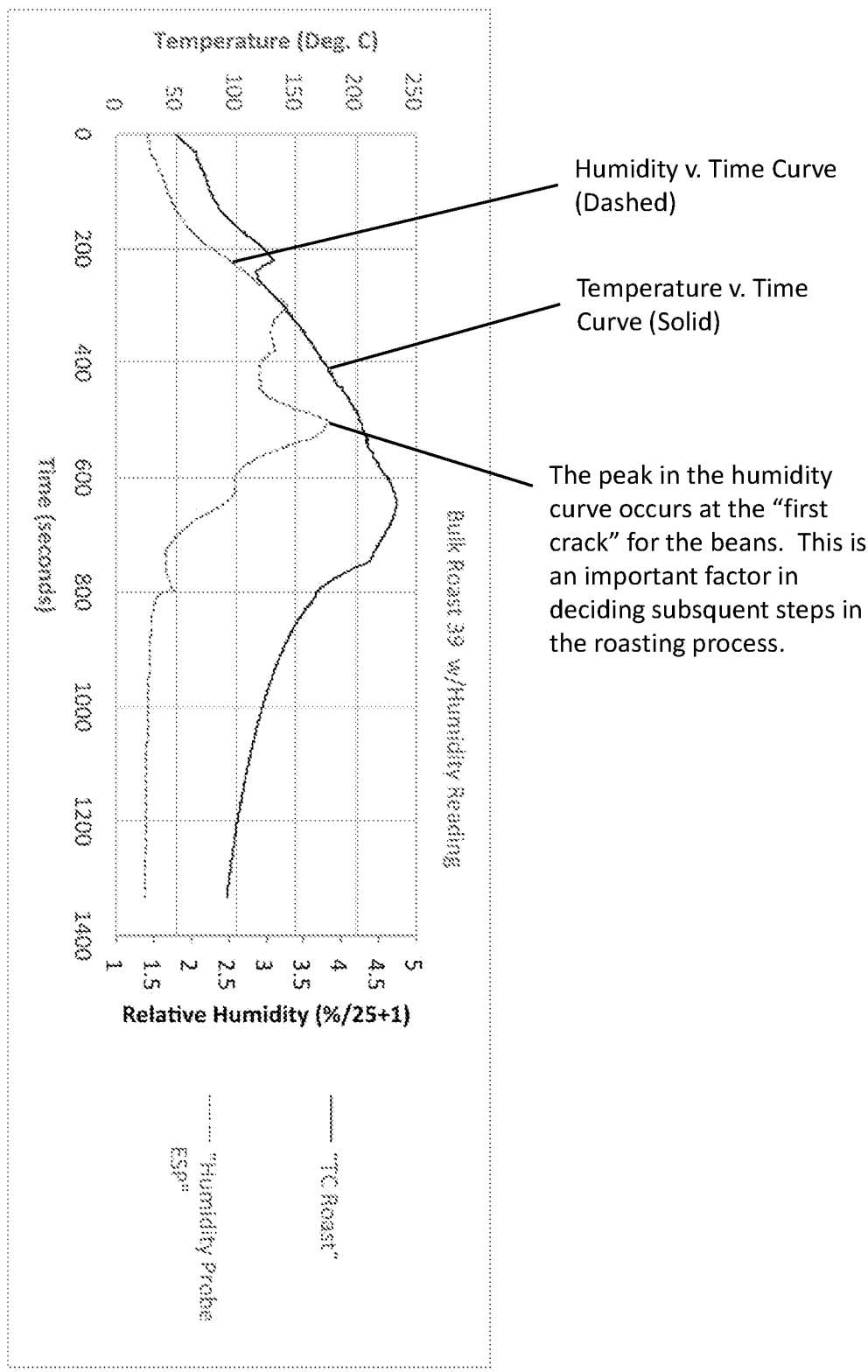
FIG. 4 is a graphical representation of an example of a roasting profile including graphs of temperature (solid) and humidity (dashed) versus time.

FIG. 4 is a graph of an example of temperature and humidity versus time. The values in this graph are generated using sensors 40 that are placed at or proximate to the outlet 6 of the roasting chamber 4. As shown, a relatively sharp peak in the graph of humidity versus time corresponds to the "first crack" milestone of the roasting development step 64.

Figure 5:
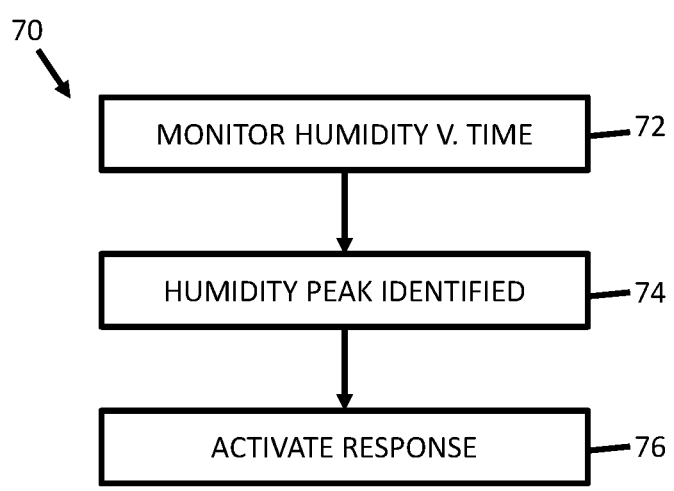
FIG. 5 is a flowchart representing a process that can take place during a roasting operation.

FIG. 5 is a flowchart depicting an example roasting process 70. Roasting process 70 can be similar to and/or preformed in conjunction with the roasting steps 60-64 except that it incorporates additional operations. According to step 72, the humidity is monitored by the H sensor 40 at the outlet 6 of roasting chamber 4. As part of step 72, the controller 42 analyzes the graph of humidity versus time (or an equivalent such as a look-up table stored in memory, an equation presenting the humidity-time curve) to identify rapid changes in a magnitude of the slope and a localized maximum.

According to step 74, a humidity peak is identified. This corresponds to the "first crack" of the beans. This identification of the humidity peak indicates a certain progress of the roasting process 70.

According to step 76, a response or action is activated in response to the identification of the first crack milestone. This can take any number of forms.

In one implementation the roast development duration is automatically adjusted based upon the milestone identification and a desired roast type. In this implementation parameters such as the heater power, airflow, and/or bypass percentages can also be adjusted.

In another implementation an alert can be automatically sent to a person who is responsible for the roasting operation. For example, this can be a message wirelessly sent to a mobile device that is utilized by the person. The message can provide an option for the person to adjust the roast profile based upon the timing of the milestone.

Figure 6:
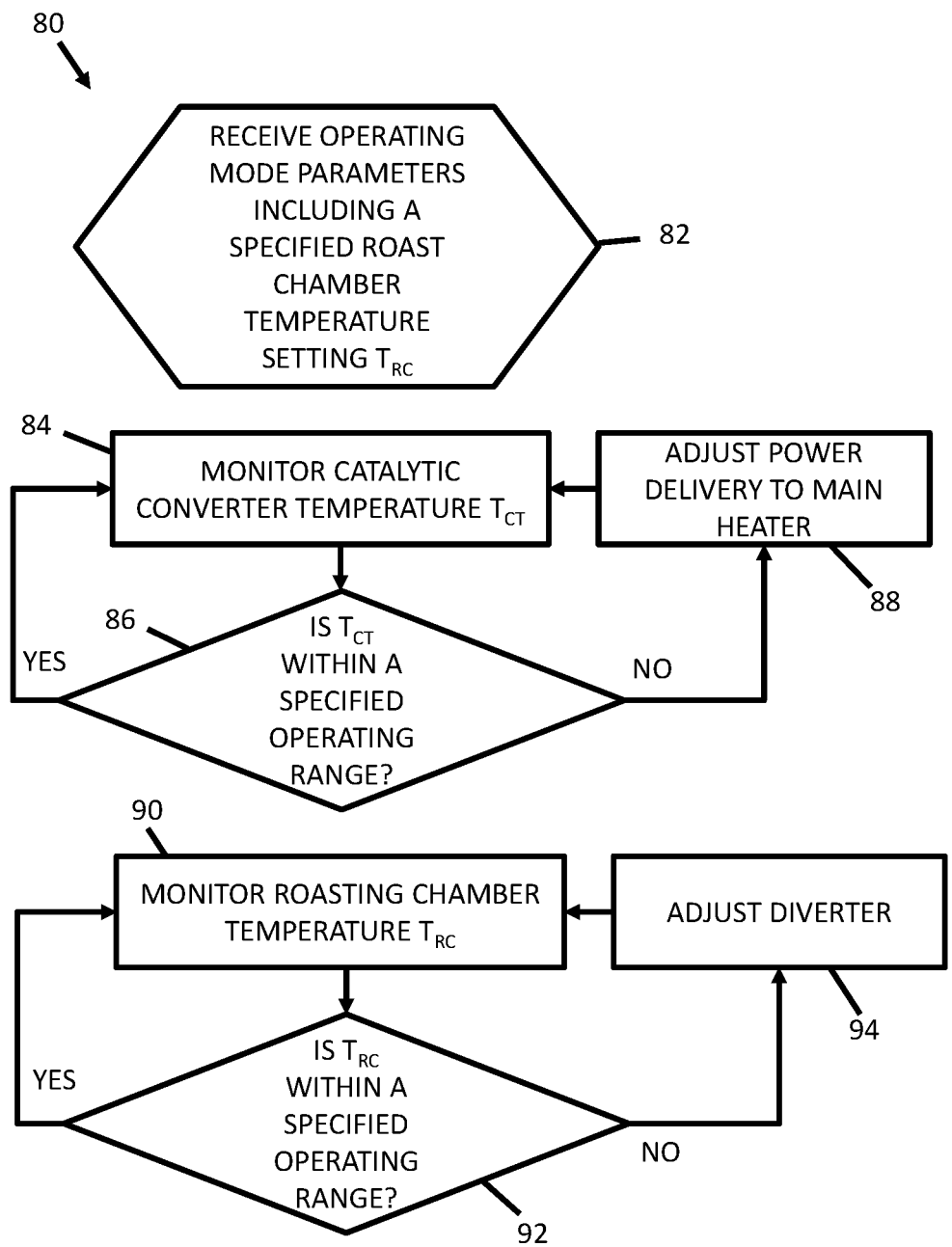
FIG. 6 is a flowchart depicting an example method by which a controller modulates temperatures for catalytic converter and roasting chamber for a given operating mode, according to an embodiment.

FIG. 6 is a flowchart depicting an example method 80 by which the controller 42 modulates temperatures for the catalytic converter 30 and the roasting chamber 4 for a given operating mode. As discussed above, the catalytic converter 30 temperature $T_{CT}$ can be maintained at an optimum temperature for catalysis that tends not to change as a function of an operating mode of the roasting system 2. On the other hand, the roast chamber 4 temperature $T_{RC}$ is a function of the operating mode.

According to step 82 the method 80 begins with a receipt of operating parameters for an operating mode including a specified roast chamber setting $T_{RC}$. The method 80 then includes two independent temperature control loops that can be executed concurrently. An example catalytic converter 30 temperature $T_{CT}$ control loop is depicted by steps 84 to 88. An example roasting chamber 4 temperature control loop is depicted by steps 90 to 94.

According to step 84 a temperature $T_{CT}$ of the catalytic converter 30 is monitored. As part of step 84, the controller 42 receives temperature $T_{CT}$ data for the catalytic converter 30 from a temperature sensor 40 that is within or proximate to or receiving air exiting from the catalytic converter 30.

According to step 86 a determination is made as to whether the temperature $T_{CT}$ of the catalytic converter 30 is within a specified range. This specified temperature range is within an overall temperature range of for example 500 to 1000 degrees Fahrenheit. In one implementation the specified temperature range is narrower and centered around a temperature of about for example 800 degrees Fahrenheit. If the temperature $T_{CT}$ of the catalytic converter 30 deviates from the specified range, then the method 80 proceeds to step 88. According to step 88 a power delivered to the main heater 28 is adjusted to counteract the temperature deviation determined in step 86. As part of step 88 the controller 42 sends a control signal to adjust a power input to the heater 28. Then steps 84 and 86 are repeated. When according to step 86 the temperature $T_{CT}$ of the catalytic converter 30 is within the specified range, the loop proceeds to step 84 to continue monitoring the temperature $T_{CT}$ of the catalytic converter 30.

According to step 90 a temperature $T_{RC}$ of the roasting chamber 4 is monitored. As part of step 90, the controller 42 receives temperature $T_{RC}$ data for the roasting chamber 4 from a temperature sensor 40 that is either within or proximate to or receiving air exiting from roasting chamber 4.

According to step 92 a determination is made as to whether the temperature $T_{RC}$ of the roasting chamber 4 is within a specified range. This specified range is based upon the specified roast chamber temperature setting $T_{RC}$ for the current operating mode from step 82. If the temperature $T_{RC}$ of the roasting chamber 4 deviates from the specified range, then the method 80 proceeds to step 94.

According to step 94, the variable diverter 22 is adjusted to counteract the deviation. As part of step 94 the controller 42 sends a control signal to the variable diverter 22. In response to the control signal, the variable diverter 22 increases or decreases the bypass percentage. For example, if the temperature is too high then the bypass percentage will be increased. Then steps 90 and 92 are repeated. When according to step 92 the temperature $T_{RC}$ of the roasting chamber 4 is within the specified range, the loop proceeds to step 90 to continue monitoring the temperature $T_{RC}$ of the roasting chamber 4.

The two temperature control loops for the catalytic converter 30 and the roasting chamber 4 continue independently of each other from the perspective of a control system operation. However, they do have an indirect dependency. When the heater 28 is adjusted according to step 88 this will impact the temperature $T_{RC}$ of the roasting chamber 4. Then the control loop for the roasting chamber 4 will most likely need to respond.

FIGS. 7-13 and 15-16 illustrate an embodiment of a roasting chamber assembly 4. In describing roasting chamber assembly 4, mutually orthogonal axes X, Y, and Z will be used. The axes X and Y are generally lateral axes that can be very nearly horizontal. Axis Z is a vertical axis that can be very nearly aligned with a gravitational reference. The direction +X is toward the front or anterior and the direction –X is toward the back or posterior. The direction +Z is upward and the direction –Z is downward.

Figure 7:
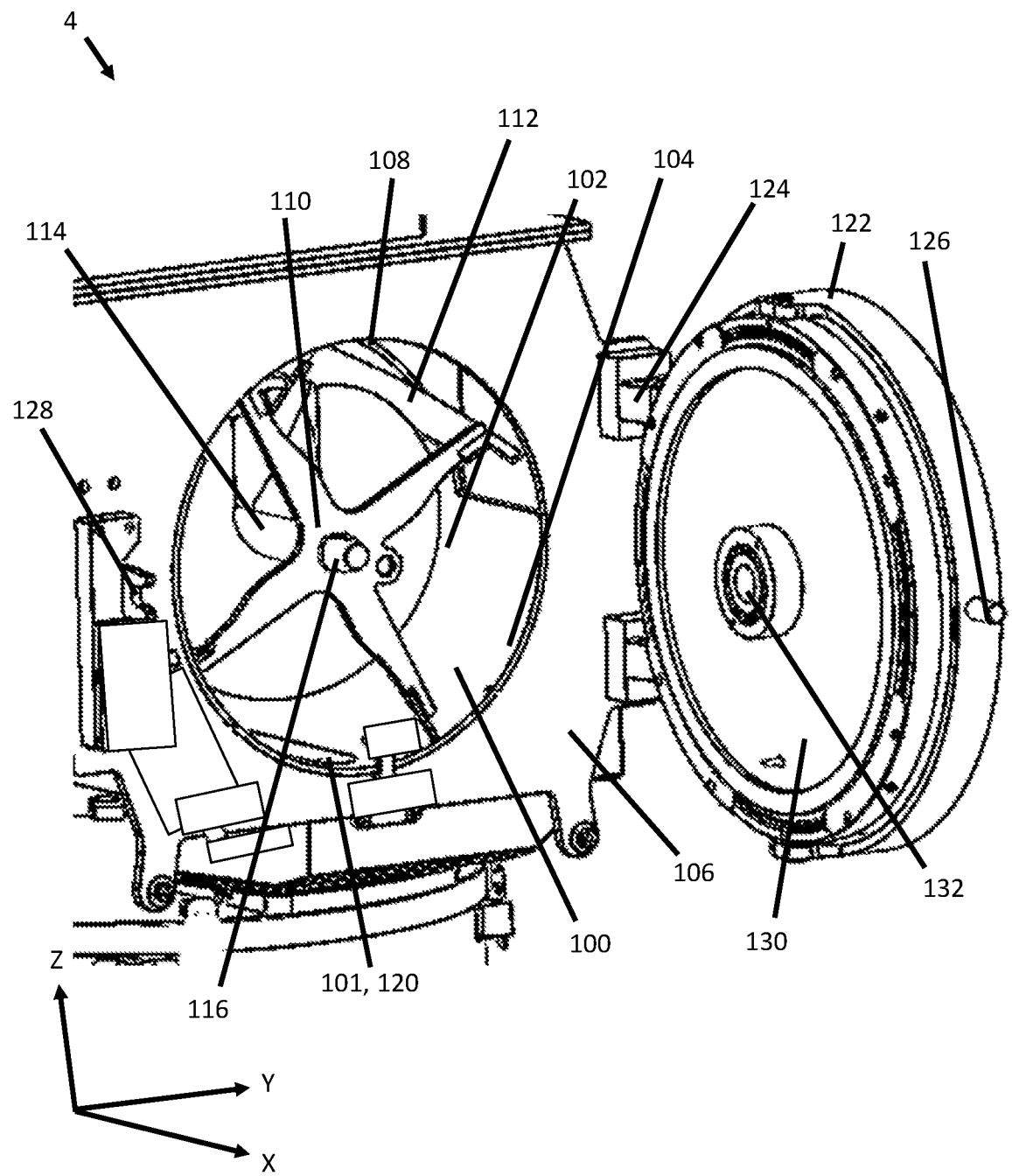
FIG. 7 is an isometric view of a portion of a roasting chamber assembly, according to an embodiment.

FIG. 7 is an isometric view of a portion of the roasting chamber assembly 4. Roasting chamber assembly 4 includes a cylindrical roasting drum 100 defining a horizontal central axis that is aligned with the X-axis. The drum 100 extends from a back end 102 to a front end 104. The front end 104 of the drum 100 is proximate to a front portion 106 of the roasting chamber assembly 4. In the illustrated embodiment, the front portion 106 is a front plate 106. In other embodiments, the front portion or plate 106 can be a portion of a housing of the roasting chamber assembly 4. Front plate 106 defines a vertical opening 108 that is proximate to the front end 104 of the drum.

Within the drum 100 is an agitator 110 including a plurality of blades 112 mounted to a shaft 114. The central shaft 114 has an anterior end portion 116 with a conical taper. The anterior end portion 116 tapers in the +X direction. The shaft 114 has a posterior end 118 (FIG. 8 which is a top view of the roasting chamber assembly 4) that is proximate to the back end 102 of drum 100. The posterior end 118 of shaft 114 is coupled to the agitator motor 41. The agitator motor 41 is configured to rotate the agitator 110 about the shaft 114.

A lower surface 101 of the drum 100 is partly defined by a hatch 120. The hatch 120 can be lowered to provide an opening in the bottom of the drum 100. This allows beans contained in the drum 100 to be emptied into a cooling chamber. Details of the hatch will be discussed infra.

A door 122 is mounted to the front plate 106 by a hinge 124. The door 122 can be rotated inwardly about the hinge 124 so that a pin 126 can be latched by a catch 128. In the latched state, the door 122 closes and seals the vertical opening 108 in front plate 106. The door includes a glass plate 130 that allows the contents of the drum 100 to be viewed during a roasting operation. The door 122 also includes a bearing assembly 132 configured to receive the anterior end portion 116 of the shaft 114 when the door 122 is closed upon the opening 108. Thus, the bearing assembly 132 supports the agitator 110.

Figure 8:
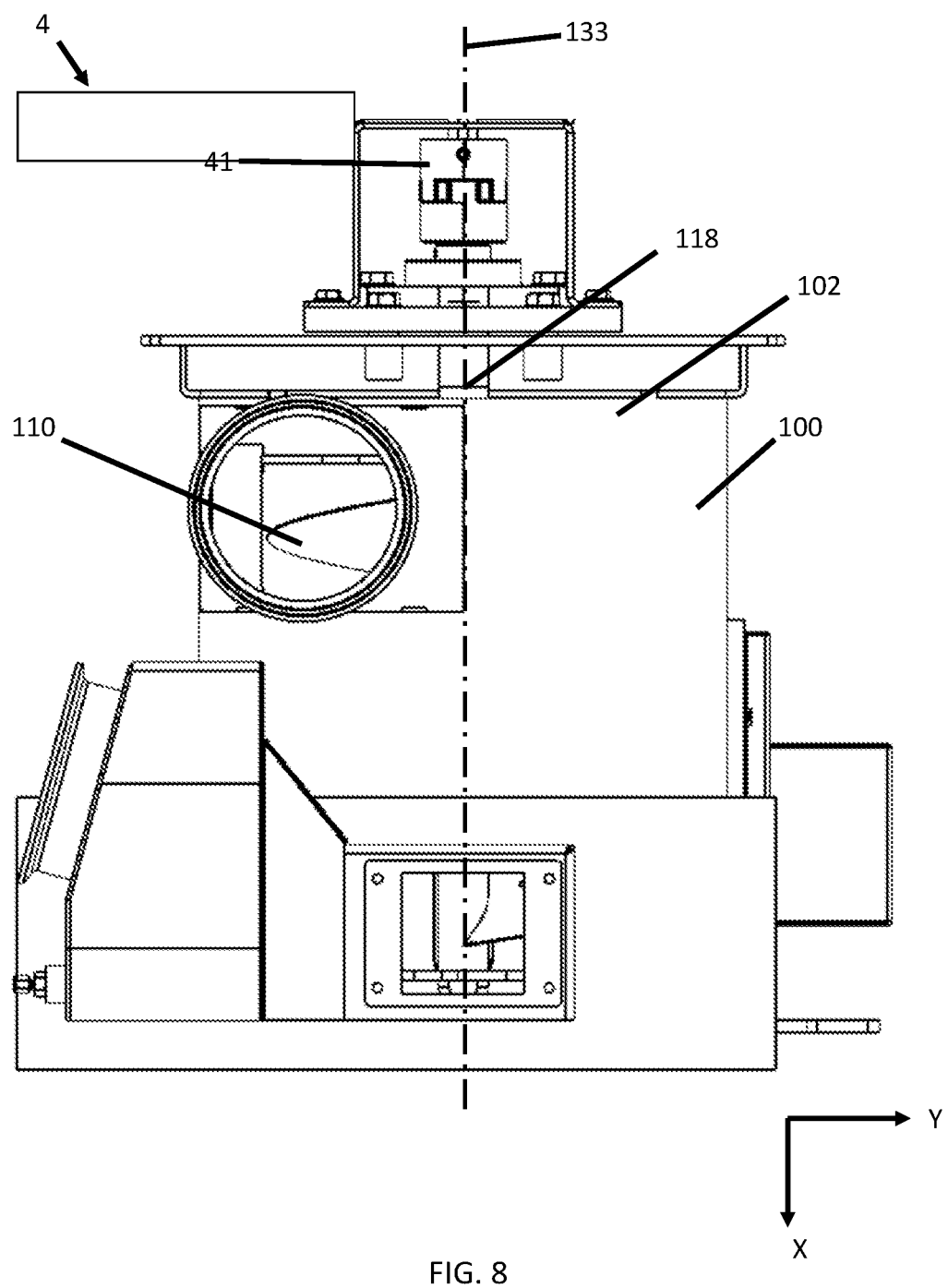
FIG. 8 is a top view of a roasting chamber assembly that is partially shown in FIG. 7.

FIG. 8 is a top view of the roasting chamber assembly 4. Illustrated is the horizontal central axis 133 of the drum 100. Horizontal central axis 133 is aligned with an axis of rotation of the agitator motor 41 and agitator 110.

Figure 9:
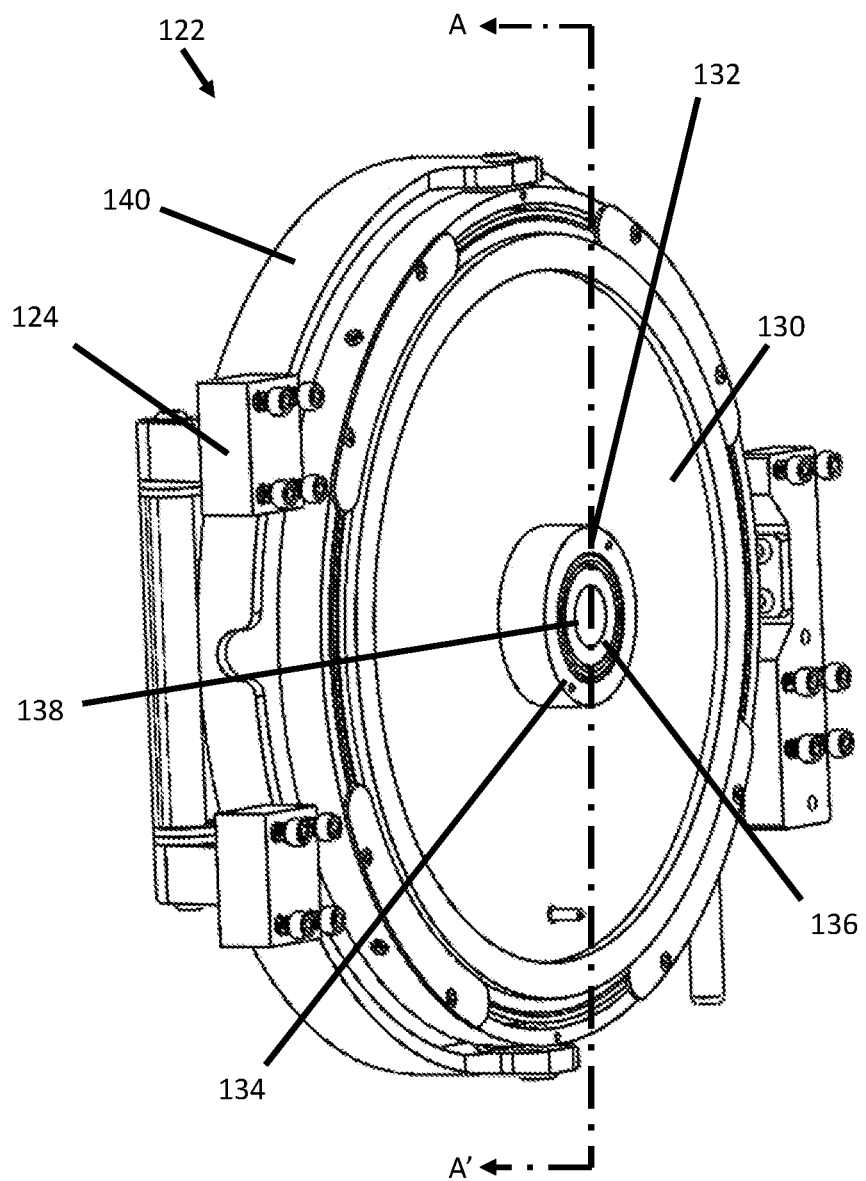
FIG. 9 is an isometric drawing of the door of FIG. 7, in isolation.

FIG. 9 is an isometric drawing of the door 122 in isolation. The bearing assembly 132 is centrally supported upon the glass plate 130. The bearing assembly 132 includes an outer housing 134 and an inner bearing 136. When the door 130 is closed, the horizontal central axis 133 of the drum 100 is essentially coincident with an axis of rotation of the inner bearing 136 with respect to the outer housing 134. The inner bearing 136 defines a receiving hole 138. The door 122 also includes a door housing 140 that supports the glass plate 130. The door housing is coupled to hinge 124. Hinge 124 is a compound hinge that causes door motion to be nearly parallel to the X axis as the door 122 moves to a closed position. This allows the anterior end portion 116 of shaft 114 to be received into the receiving hole 138 as the door 122 closes.

Figure 10:
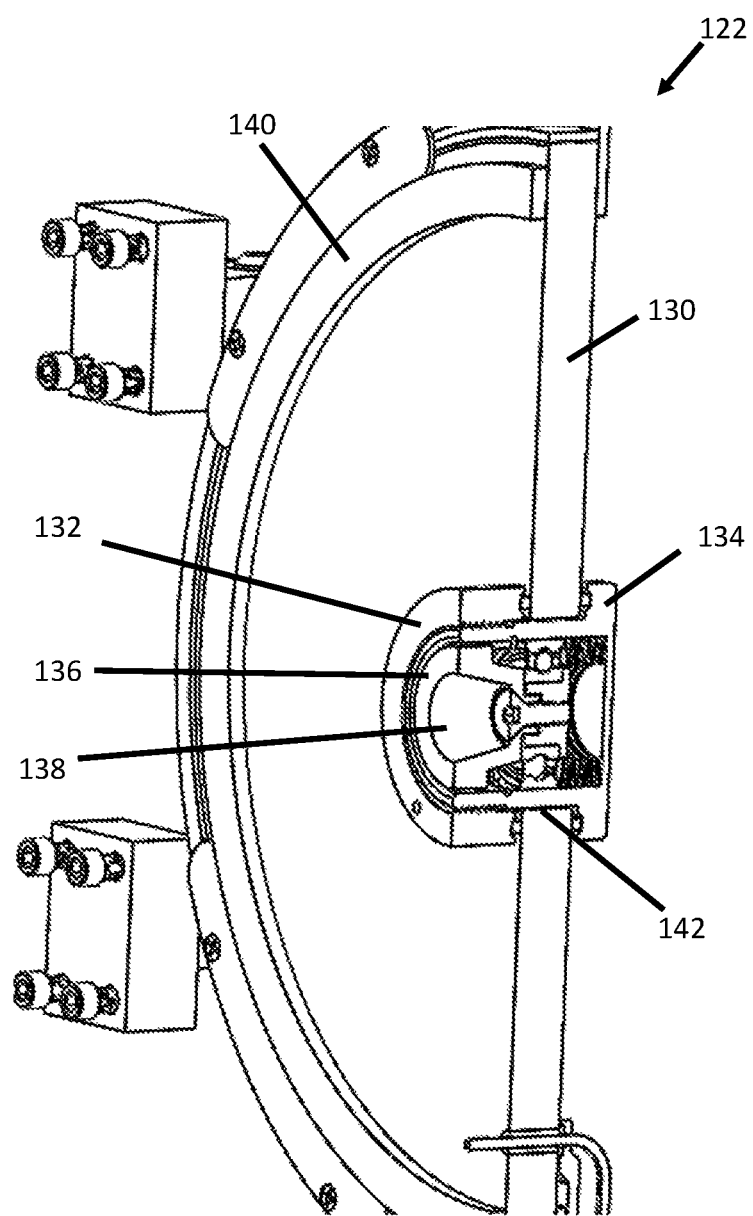
FIG. 10 is a sectional view taken from AA' of FIG. 9 to illustrate assembled components of a door.

FIG. 10 is a sectional view taken from AA' of FIG. 9 to illustrate assembled components of the door 122. The bearing assembly 132 is affixed to the glass plate 130. The outer housing 134 of the bearing assembly 132 is sealingly coupled to a central opening 142 in glass plate 130.

Figure 11:
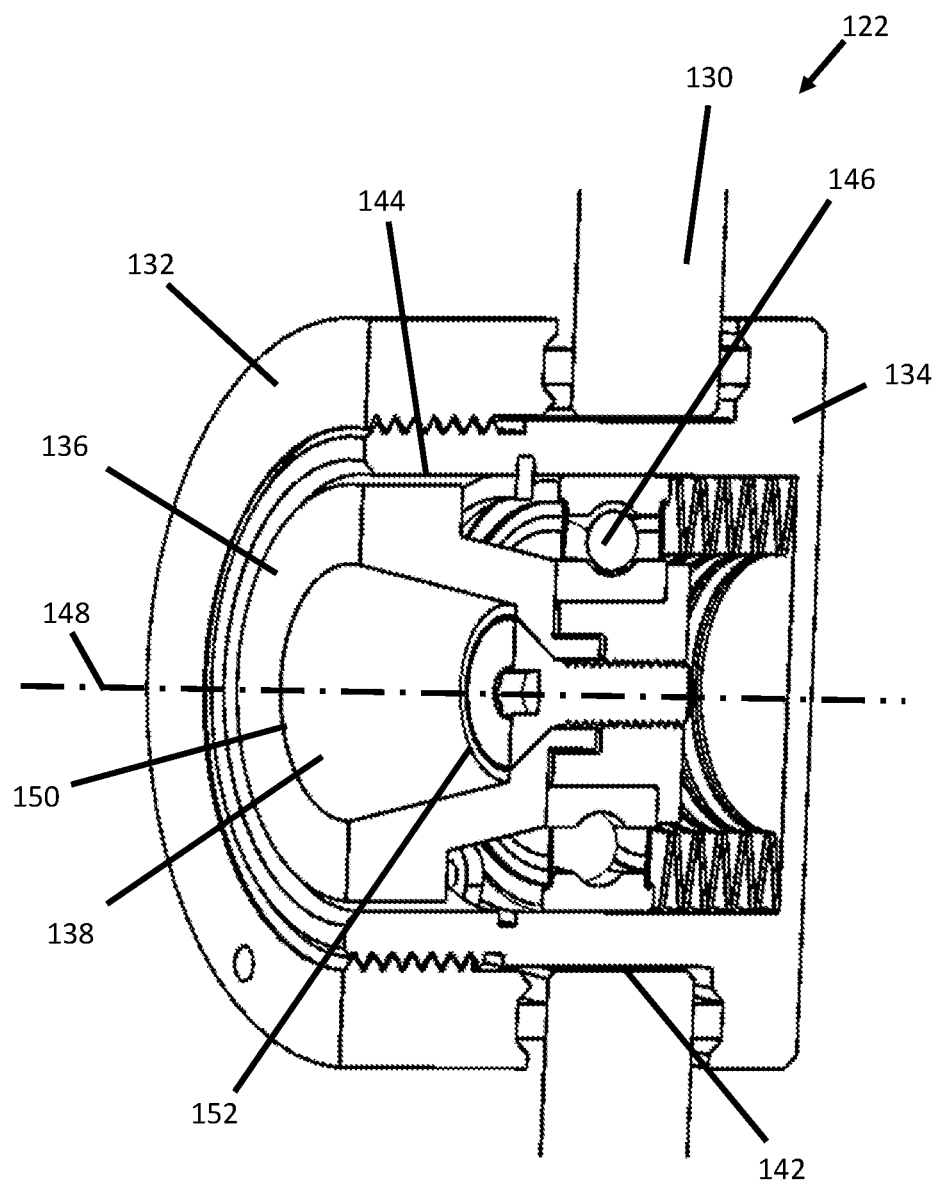
FIG. 11 is a detailed view taken from FIG. 10 to illustrate a central part of a door.

FIG. 11 is a detailed view taken from FIG. 10 to illustrate the central part of the door 122 in more detail. According to the illustrative embodiment, the glass plate 130 has a central and circular hole 142. The outer housing 134 of bearing assembly 132 is sealingly mounted to the circular hole 142 in the glass plate 130. The inner bearing 136 is mounted inside a cylindrical recess 144 within the outer housing 134. A circular ball bearing race 146 allows the inner bearing 136 to rotate freely about a door central axis 148. The central hole 138 formed into the inner bearing 136 defines a conical taper. The hole 138 tapers inwardly from its entrance 150 toward its bottom 152. When the door 122 is closed, the taper is in the +X or frontward direction. In the illustrated embodiment, the door central axis 148 is substantially a central axis for the opening 142, the central hole 138, and the axis of rotation of the inner bearing 136 with respect to the outer housing 134. When the door 122 is closed, the door central axis 148 substantially aligns with the horizontal central axis of the drum 100. Such axes are substantially aligned in that they may be equal or not exactly equal due to mechanical tolerances.

Figure 12:
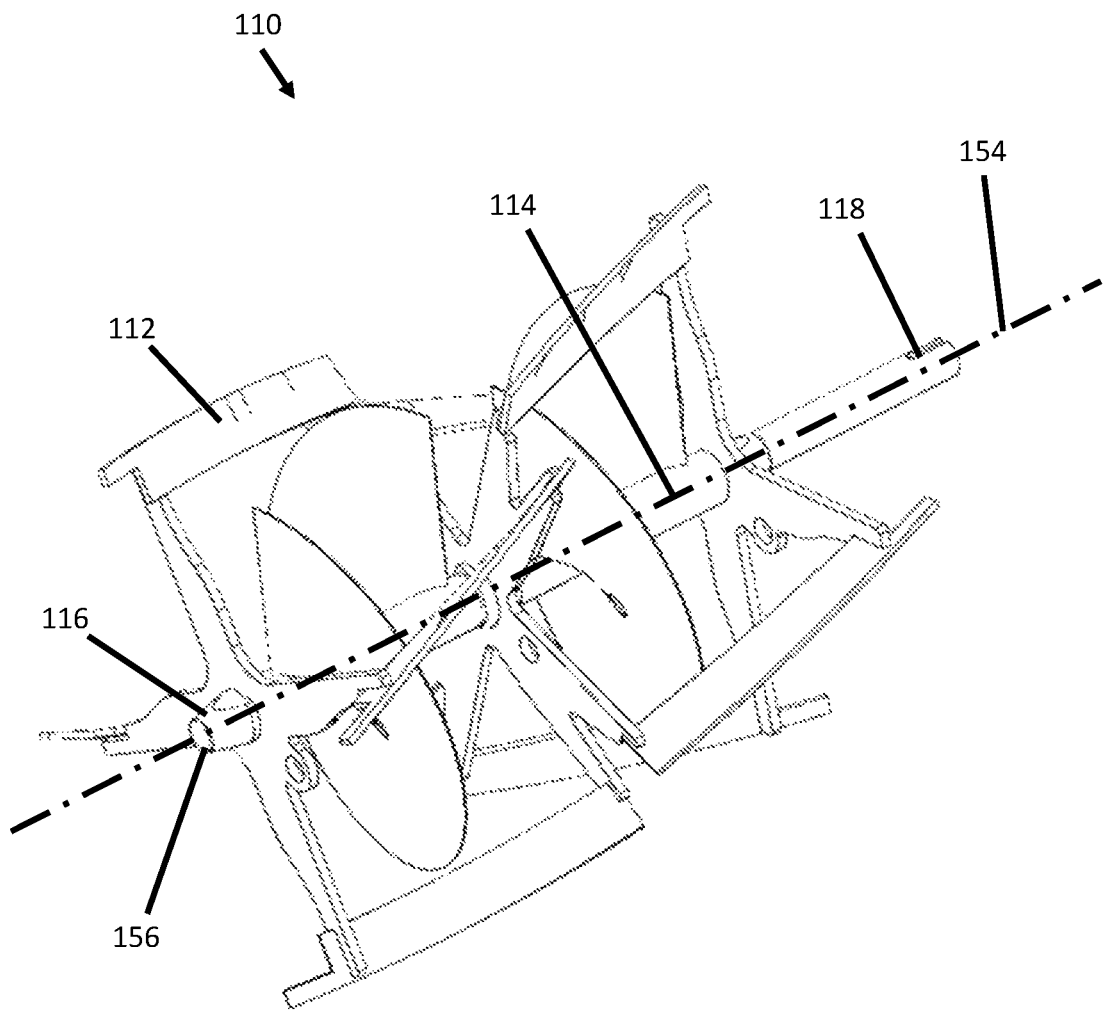
FIG. 12 is an isometric view of the agitator of FIG. 7, in isolation.

FIG. 12 is an isometric view of the agitator 110 in isolation. The shaft 114 is elongate between the posterior end 118 and the anterior end portion 116. The anterior end portion 116 of shaft 114 defines a conical taper. The anterior end portion 116 tapers in a forward direction (i.e., tapers towards the end of the anterior end portion 116). The shaft defines a shaft axis 154. When the door 122 is open, some of the blades 112 (of those closer to the anterior portion 116) rest upon the inside bottom surface 101 of the drum 100. Thus when the door 122 is open, the shaft axis 154 slopes downwardly relative to the horizontal central axis 133 of the drum 100. As the door 122 is closed, the tapered hole 138 engages (e.g., removably, slidably, receivably contacts) the anterior end portion 116 of the shaft. The engagement lifts up the anterior end portion 116 and substantially aligns the shaft axis 154 with the horizontal central axis 133 of the drum 100 and the door central axis 148.

Figure 13:
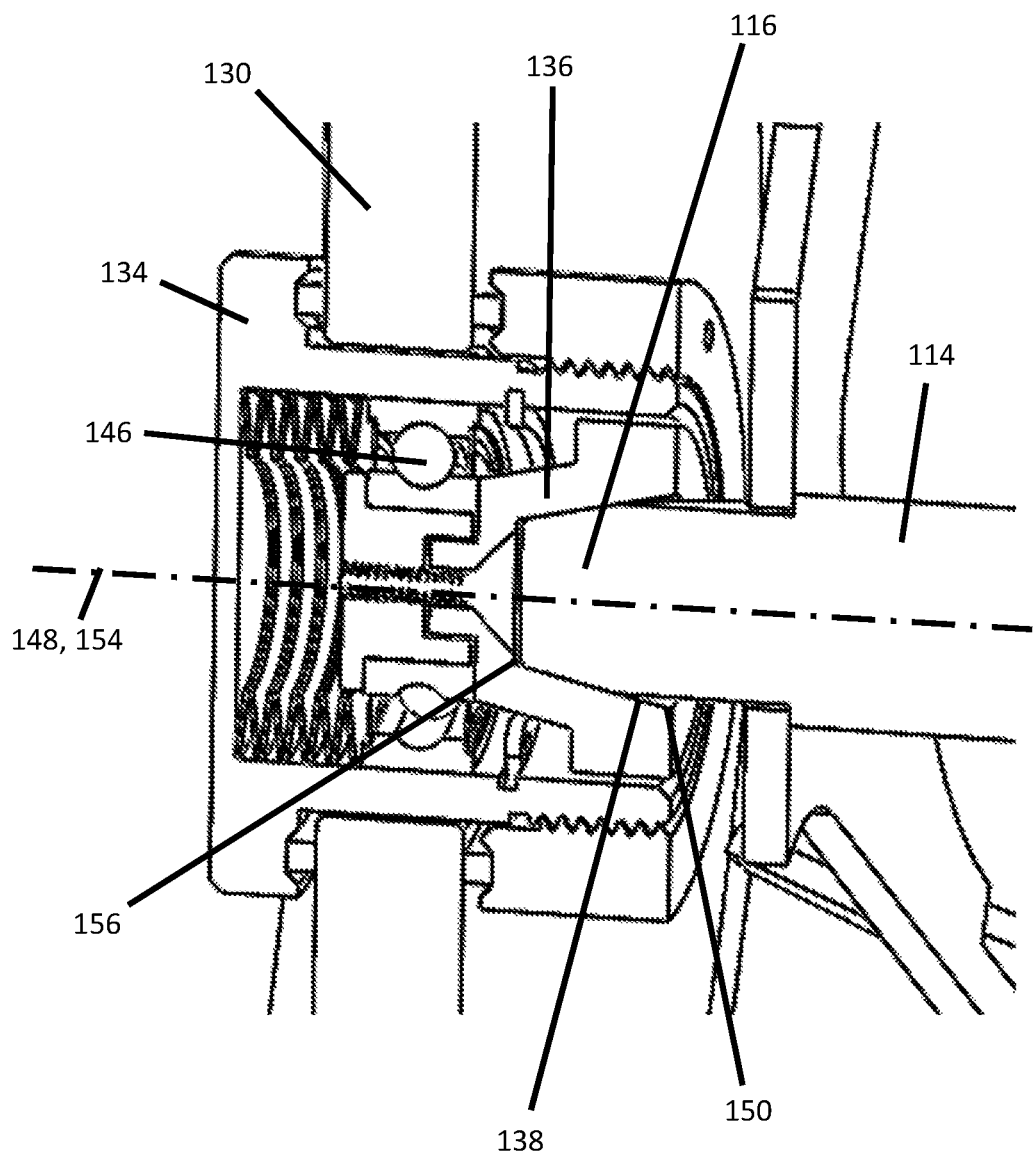
FIG. 13 is similar to FIG. 11 except that FIG. 13 includes an anterior end of a shaft received into a central hole of an inner bearing.

FIG. 13 is similar to FIG. 11 except that FIG. 13 includes the anterior end portion 116 of shaft 114 received into the central hole 138 of inner bearing 136. This is a close up cross sectional illustration when the door 122 is closed upon the vertical opening 108. According to the illustrative embodiment, the central hole 138 of inner bearing 136 and the anterior end portion 116 of shaft 114 both taper in the same forward or anterior direction. This mutual taper facilitates the proper receiving and alignment of the anterior end portion 116 to the hole 138 as the door 122 is closed. This mutual taper is mutual in the sense that the taper angle of the central hole 138 of inner bearing 136 substantially matches the taper angle of the anterior end portion 116 of shaft 114. Such taper angles substantially match in that they may be equal or not exactly equal due to mechanical tolerances. Similarly, such taper angles can substantially match in that notwithstanding differences in the taper angles, the proper receiving and alignment of the anterior end portion 116 to the hole 138 as the door 122 is closed is still accomplished. Just before the door 122 is closed, the narrowest end 156 of the anterior end portion 116 is received within the wider entrance 150 of the hole 138. Engagement of the conical surface of the anterior end portion 116 with the conical surface of the hole 138 during final closure of door 122 self-aligns the axis 154 to the axis 148 and hence to the central axis 133 of the drum 100. This also lifts the blades 112 off of the inside bottom surface of drum 100 and effectively centers the agitator 110 within the drum 100.

Figure 14:
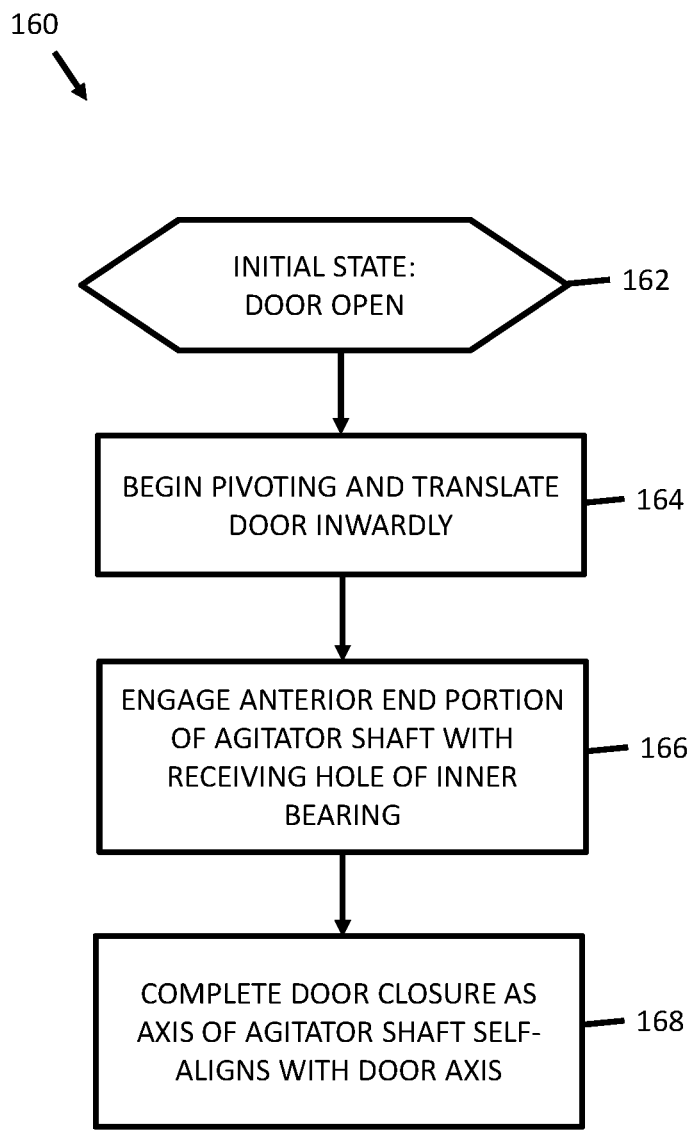
FIG. 14 is a method of self-aligning an axis of an agitator to an axis of a roasting drum in response to a door closure, according to an embodiment.

FIG. 14 is a method of self-aligning an axis of an agitator to an axis of a roasting drum in response to a door closure, according to an embodiment. FIG. 14 is described with respect to the embodiment discussed with respect to FIGS. 7-13 and 15-16, but it should be understood that the method of FIG. 14 can be performed with roasting systems having differences from the embodiment discussed with respect to FIGS. 7-13 and 15-16. As discussed with respect to FIG. 14, method 160 can "automatically" align an agitator 110 within a roasting drum 100 in response to the closure of the door 122. At 162, the door 122 is open (e.g., an open position) and the some of the agitator blades 116 rest upon the bottom surface 101 of the drum 100. At 164, the door 122 is moved toward closure (e.g., a closed position). At 166, inner bearing 136 receiving hole 138 removably engages the anterior end portion 116 of agitator 110 in response to the door 122 being moved toward closure. As part of 166, the narrowest end 156 of the shaft 114 is received in the wider entrance 150 of hole 138. At 168, the conical surfaces of the anterior end portion 116 and the receiving hole 138 engage and substantially self-align the axes 148 and 154 as the door 122 is moved to full closure. As part of 168, blades 116 are lifted off the bottom surface 101 so that they can properly rotate within drum 100 without any interference with the inside surface 158 (e.g., without contacting the inside surface 158).

Figure 15A:
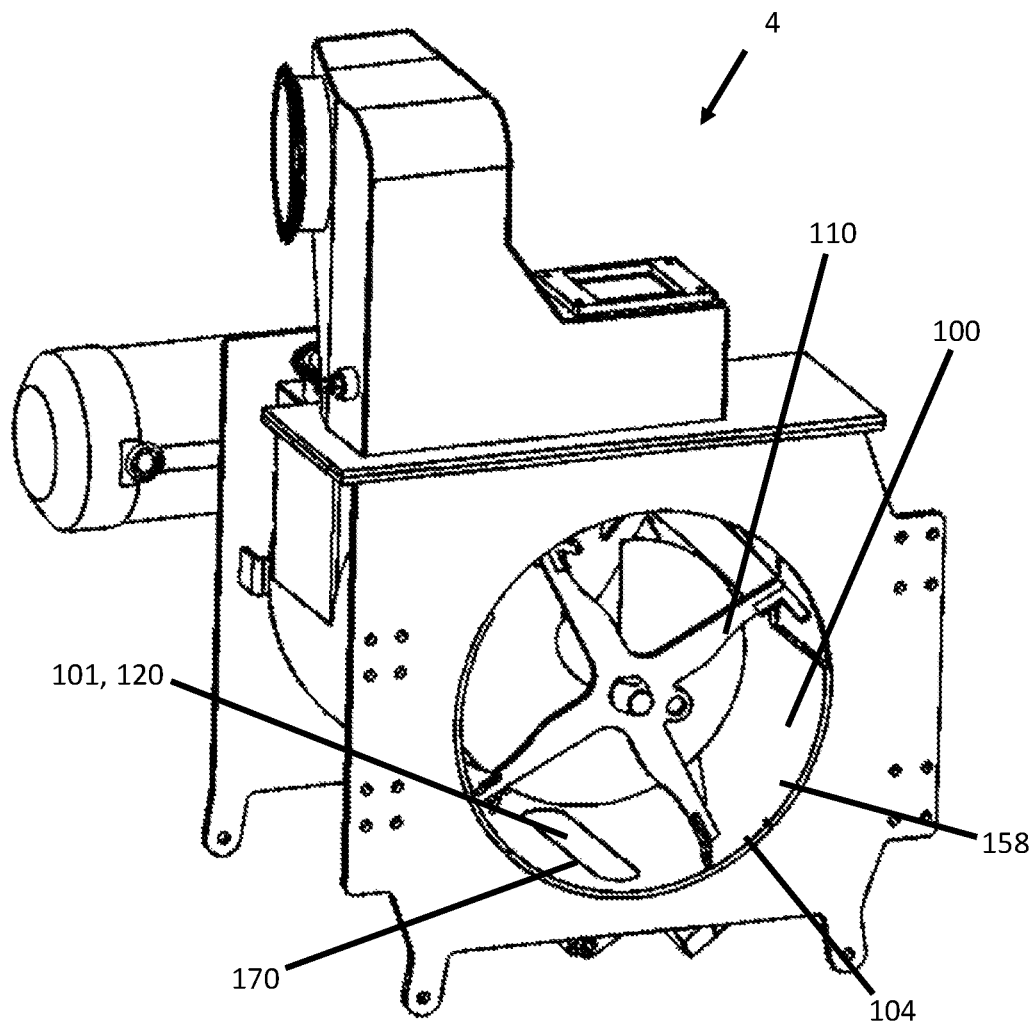
FIG. 15A is an isometric view of a roasting chamber assembly of FIG. 7 without an outer door and with an opening in a bottom surface of a drum in a sealed state.

FIG. 15A is an isometric drawing of an embodiment of the roasting chamber assembly 4 with the door 122 removed. The drum has a concave cylindrical inside surface 158. The hatch 120 defines a portion of the lower or bottom surface 101 of the inside surface 158 of the drum 100. FIG. 15A depicts an "upper position" of hatch 120 whereby it seals an opening 170 formed into the lower surface 101. In the illustrative embodiment, the hatch 120 closely matches the inside surface 158 of the drum 100 so that there are no or minimal gaps or seams between hatch 120 and inside surface 158.

Figure 15B:
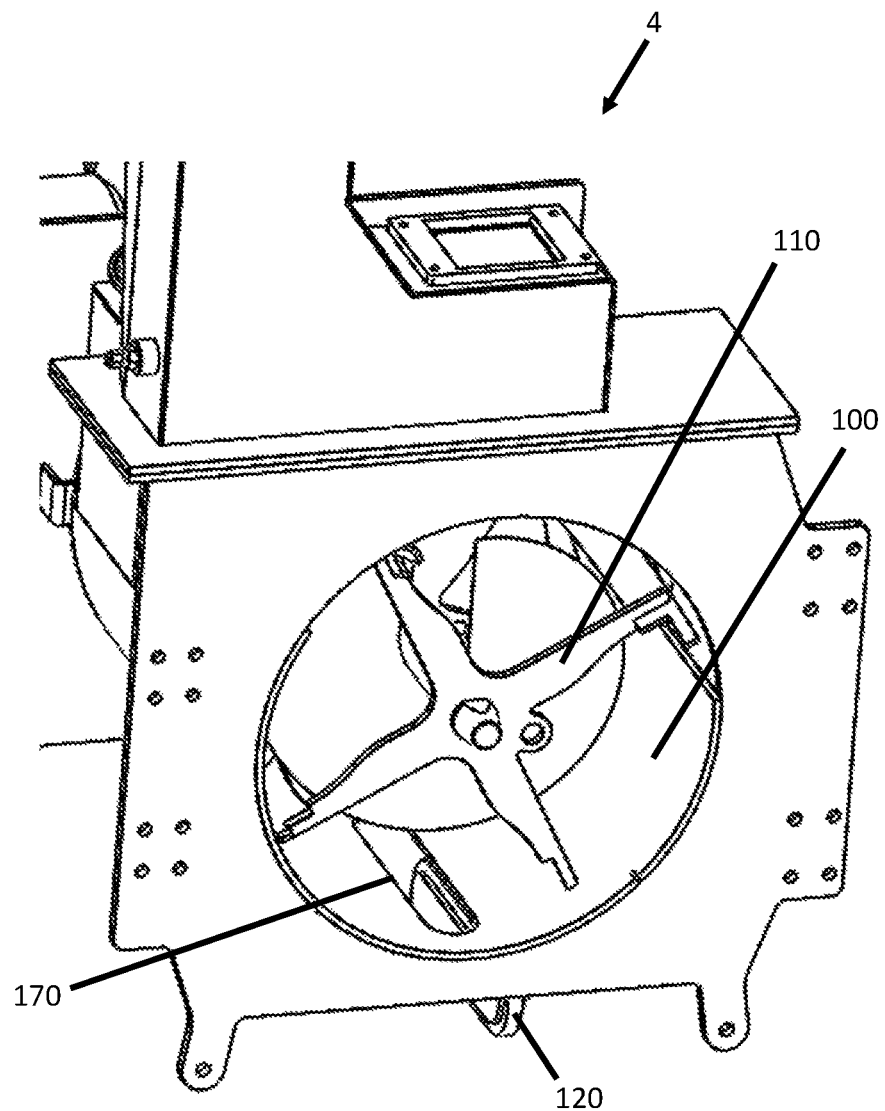
FIG. 15B is similar to FIG. 15A except that the opening in the bottom surface of the drum is in an open state.

FIG. 15B is similar to FIG. 15A except that the hatch 120 is in a lowered state whereby the opening 170 is unsealed and open whereby beans within the drum 100 can begin to exit the drum 100 in a vertically downward (−Z) direction into a cooling chamber (not shown). The opening 170 has a long axis that is substantially parallel to the central axis 133 of the drum 100. The opening 170 nearly spans the drum 100 along a dimension parallel to the central axis 133 so as to allow a more complete emptying of the beans from the drum 100.

Figure 16A:
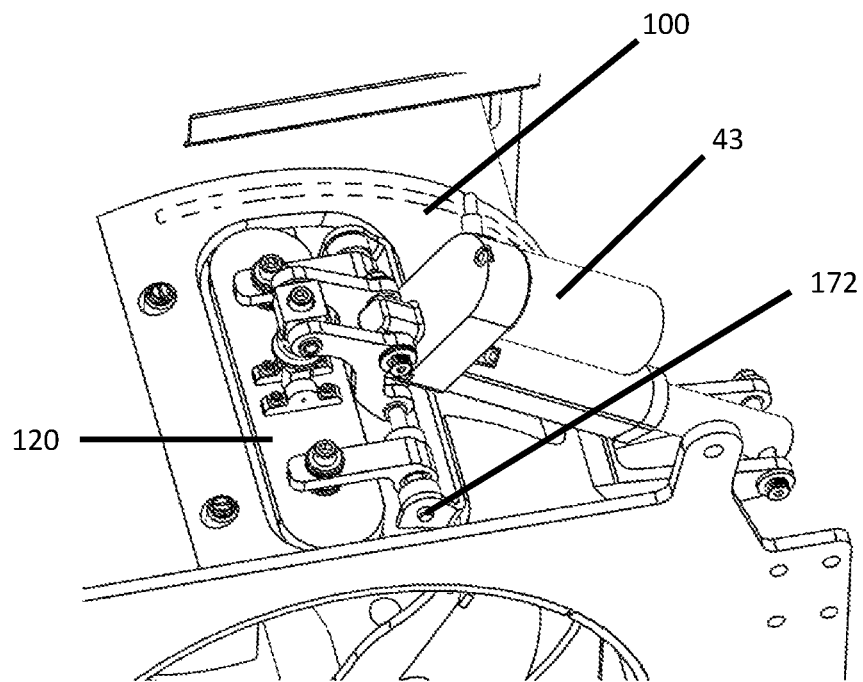
FIG. 16A is an isometric view of a lower outer portion of the drum of FIG. 7 in a sealed state.
Figure 16B:
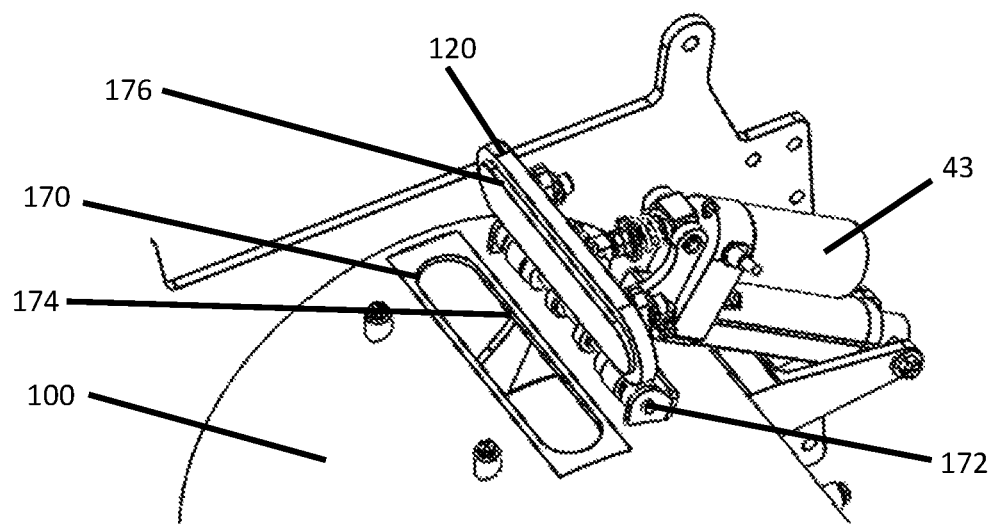
FIG. 16B is an isometric view of a lower outer portion of the drum of FIG. 7 in an open state.

FIGS. 16A and 16B are isometric bottom view drawings of a lower outer portion of drum 100. FIGS. 16A and 16B illustrate the upper and lower positions of the hatch 120 respectively. In the illustrated embodiment, the hatch 120 is coupled a lower outside surface of the drum 100 by a hinge 172. The hinge 172 has an axis of rotation that is parallel to the central axis 133 of the drum 100. Also shown is the actuator 43 (also referred to as a bean drop actuator 43 with respect to FIG. 2) that is configured to rotate the hatch 120 about the hinge 172 under control of controller 42. In one implementation, the actuator 43 includes a motorized screw that extends and contracts the actuator 43 to provide the rotation of the hatch 120.

The opening 170 in the lower surface 101 of the drum 100 is bounded by a vertical inward facing edge 174. The hatch 120 has an outward facing edge 176. When the hatch is in the upper (FIG. 16A) position the edges 174 and 176 are in facing relation. The edges 174 are 176 are closely matching so that there is a minimal gap there between.

Figure 17:
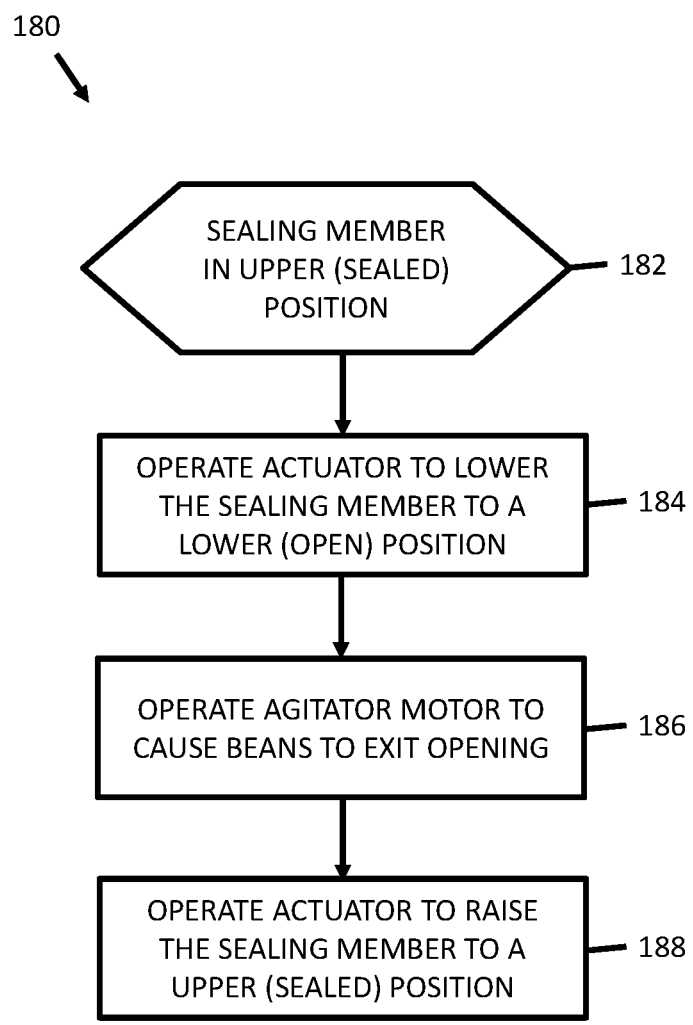
FIG. 17 is a flowchart of a method for removing contents of a roasting drum, according to an embodiment.

When beans in drum 100 are finished with a roasting process, they are transferred to a cooling chamber. FIG. 17 depicts a method 180 for the transfer under control of controller 42. Method 180 corresponds to the bean drop step 66 of method 50 of FIG. 3. According to an initial condition 182, the hatch 120 is in an upper (sealed) position as depicted in FIGS. 15A and 16A. At 184, the actuator 43 is operated to rotate and lower the hatch 120 to the lowered (open state for opening 170) state as depicted in FIGS. 15B and 16B.

At 186, the agitator motor 41 is operated to rotate the agitator 110 backwards and forwards about axis 154. This pushes the beans backwards and forwards in a direction having a component parallel to axis 133 in the drum 100 until they have essentially all fallen through the opening 170 and into a cooling chamber. At 188, the actuator 43 is operated to rotate and raise the hatch 120 to the initial upper (sealed) position.

The specific embodiments and applications thereof described above are for illustrative purposes only and do not preclude modifications and variations encompassed by the scope of the following claims.

What is claimed:

1. A bean roasting system having a roasting chamber assembly, comprising:
  a roasting drum having an opening and having an inside surface with a back end and a front end;
  an agitator having blades mounted to an axial shaft, the axial shaft having an anterior end portion; and
  a door mounted rotationally relative to the opening of the roasting drum, the door including:
    a glass plate to provide visual access to contents inside the roasting drum when the door is closed over the opening; and
    a bearing assembly including an outer housing mounted to the glass plate and an inner bearing defining a receiving hole that receives and supports the anterior end portion of the axial shaft when the door is closed.

2. The bean roasting system of claim 1 the axial shaft has a posterior end, the bean roasting system further comprising a motor system that supports and is configured to rotate the posterior end.

3. The bean roasting system of claim 1 wherein the agitator blades rest against a lower inside surface of the roasting drum when the door is rotated away from the opening and in an open position.

4. The bean roasting system of claim 3 wherein moving the door to a closed position causes the receiving hole of the bearing assembly to engage the anterior end portion and lift to a blade assembly off of the lower inside surface of the roasting drum.

5. The bean roasting system of claim 1 wherein the receiving hole in the bearing assembly is tapered to provide an alignment between the receiving hole and the anterior end portion of the axial shaft.

6. The bean roasting system of claim 5 wherein the axial shaft tapers toward the anterior end portion.

7. The bean roasting system of claim 6 wherein the axial shaft anterior end portion has a taper angle that substantially matches a taper angle of the receiving hole.

8. The bean roasting system of claim 1 further comprising a circular ball bearing race between the outer housing and the inner bearing of the bearing assembly.

9. The bean roasting system of claim 1 wherein the glass plate has an opening, the bearing assembly seals to the glass plate to seal the opening in the glass plate.

10. The bean roasting system of claim 1 wherein the inside surface of the roasting drum defines a central axis of the roasting drum, the axial shaft of the agitator defines a central axis of the agitator, the central axis of the roasting drum is substantially aligned to the central axis of the agitator when the anterior end portion of the axial shaft engages the receiving hole as the door is moved to a closed position.

11. The bean roasting system of claim 1, further comprising:
   a front plate fixedly coupled to the roasting drum and defining an opening substantially aligned with the opening of the roasting drum, the door rotationally mounted to the front plate.

12. A bean roasting system, comprising:
   a roasting drum defining an opening, a horizontal central axis, a back end and a front end;
   an agitator having blades mounted to an axial shaft, the axial shaft having an anterior end portion and defining an axis of rotation of the agitator;
   a door mounted rotationally relative to the roasting drum, the door including:
      a bearing assembly including (1) an outer housing that mounts to the door and (2) an inner bearing defining a receiving hole that engages the anterior end portion of the axial shaft and substantially aligns the axis of rotation with the horizontal central axis of the roasting drum as the door is moved to a closed position.

13. The bean roasting system of claim 12, further comprising:
   a front plate fixedly coupled to the roasting drum and defining an opening substantially aligned with the opening of the roasting drum, the door rotationally mounted to the front plate.

14. An apparatus, comprising:
   a roasting drum defining a horizontal central axis;
   an agitator having blades mounted to an axial shaft, the axial shaft having an anterior end portion and defining an axis of rotation of the agitator;
   a door operationally coupled to the roasting drum and having an open position and a closed position relative to the roasting drum; and
   a bearing assembly fixedly coupled to the door and defining a receiving hole that removably engages the anterior end portion of the axial shaft and substantially aligns the axis of rotation with the horizontal central axis of the roasting drum as the door is moved to a closed position.

15. A method of operating a roasting system, comprising:
   removably engaging an anterior end portion of an axial shaft of an agitator in response to a door of the roasting drum being moved from an open position to a closed position; and
   elevating an axis of rotation of the axial shaft to thereby raise blades attached to the axial shaft out of contact with the roasting drum in response to the removably engaging.

16. The method of claim 15 wherein the removably engaging substantially aligns the axis of rotation with a horizontal central axis of the roasting drum.

17. The method of claim 15 wherein the door includes a bearing assembly including an inner bearing defining a receiving hole, the removably engaging includes a narrowest end of the anterior portion being received into an entrance of the receiving hole.

18. The method of claim 17, wherein the inner bearing is configured to rotate about an axis of rotation that substantially aligns with the axis of rotation of the axial shaft during the removably engaging.

* * * * *